3,139,413
TRIAZINE KETONE FORMALDEHYDE CONDENSATION PRODUCTS AND PREPARATION THEREOF
Peter Pinten, Cologne-Deutz, Germany, assignor to Dynamit-Actien-Gesellschaft vormals Alfred Nobel & Co., Bezirk Cologne, Germany, a German corporation
No Drawing. Filed Sept. 10, 1958, Ser. No. 760,089
Claims priority, application Germany Sept. 14, 1957
11 Claims. (Cl. 260—29.4)

The present invention relates to the production of melamine formaldehyde type resins and has, as its object, providing for the production of such resins from more readily available material than has heretofore been used for such production.

Melamine resins since their discovery more than 20 years ago have achieved considerable importance in many fields, whether for the production of molded articles, decorative trays, varnishes, or for the improvement of properties of fabrics, etc. In contradistinction to this, the resins prepared from ketones with formaldehyde, which have been known for even longer, are of no substantial practical importance, although acetone, the most important ketone, is available at low price.

It is therefore surprising that by the joint condensation of melamine type compounds and ketones with aldehydes, particularly formaldehyde, industrially valuable resins would be obtained. The particular advantages of these resins consist in their extensive solubility in water in precondensed state and the rapidity with which they can be subsequently hardened at relatively low temperatures. They are therefore excellently suited as binders for the preparation of molding compositions, hard papers, wooden boards, grinding wheels, varnishes, lacquers, etc.

According to the invention, there can be produced hardenable water soluble liquid synthetic resins by the steps including admixing as reactants a triazine compound, a ketone, and formaldehyde in the presence of an alkaline condensing agent. The admixture is maintained in the presence of the alkaline condensing agent at a temperature and for a time sufficient for the said reactants to react to form the water soluble liquid synthetic resin.

The liquid synthetic resin can be converted to a hardened resin by admixing the liquid resin with an alkaline condensing agent. Preferably, however, an acid catalyst is used to form the hardened resin. Thus, the hardened resin can be formed by maintaining the acid catalyzed resin at a temperature and at a pressure and for a time sufficient to convert the liquid synthetic resin to a hardened resin.

The triazine compound can be melamine or mono substituted melamine. It can be of the formula:

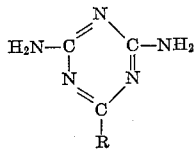

wherein R is a radical selected from the group consisting of amino, lower alkyl for example methyl, aromatic for example phenyl, and thioalkyl for example thioethyl. The preferred triazine compound is melamine. Other suitable triazine compounds are benzoguanamine, acetoguanamine, and thioammeline ethyl ether, for which R is the above formula is, respectively, ethyl, methyl and thioethyl ($C_2H_5S-$). Mixtures of the triazine compounds can be employed.

Suitable ketones are acetone, methyl ethyl ketone and acetophenone. Acetone is preferred because of its good reactivity and favorable price. Other ketones of reactivity similar to the reactivity of acetone and methyl ethyl ketone can be employed. Mixtures of suitable ketones, for example a mixture of methyl ethyl ketone and acetophenone, can be employed.

If desired, the condensation can be carried out in combination with the condensation of urea, dicyandiamide, urethanes, phenols, etc. Further, while formaldehyde is employed in the reaction, there can be employed, in addition to formaldehyde, other aldehydes.

The proportions of the components of the resin of the invention can be 1 to 3 mols of ketone per mol of triazine compound and 3 to 9 mols of formaldehyde per mol of triazine compound.

The reaction to produce the liquid synthetic resins must be carried out in the presence of an alkaline catalyst, and more particularly a weakly alkaline catalyst. Suitable catalysts for this purpose are those alkaline catalysts well known in the art for the production of resins, such as sodium hydroxide, potassium hydroxide, sodium carbonate, potassium carbonate, borax, tertiary sodium phosphate, tertiary amines, etc. As acid catalysts for the hardening of the resin to a hardened resin, there can likewise be employed acid catalysts known in the art for the hardening of resins, such as for example, acetic acid.

An aqueous reaction medium is suitable for the production of the resins. Alcohols or other solvents can be present in the medium. The pH for the condensation, corresponding to the use of weakly alkaline catalyst, is in the range of about 7.5 to 9.0.

There can be added to the resins of the invention phenoplasts, aminoplasts, fillers, etc., depending on the properties which it is desired to obtain.

In aid of further understanding of the invention, there will now be set forth examples of representative embodiments thereof. In these examples the term "parts" means parts by weight, unless otherwise indicated.

*Example I*

126 parts melamine, 174 parts acetone, 500 parts of formalin (30%) are boiled with agitation for 3 hours under a reflux condenser in the presence of 0.5 part of caustic soda. The thinly liquid resin thereby obtained is used to impregnate papers which, after careful drying, are pressed at 120° C. so as to form homogeneous water-resistant boards. The duration of the pressing depends extensively on the intended thickness of the board. In all cases it can be substantially accelerated by acidifying the resin.

*Example II*

126 parts of melamine, 180 parts of methylethylketone and 450 parts of formalin (40%) are boiled after the addition of 2 parts of sodium carbonate for 2 hours under a reflux condenser. 100 parts of the thinly liquid resin obtained in this manner are mixed with 20 parts of rubber latex (50%). If this mixture is used as binder for corundum particles, grinding stones of good elasticity are obtained.

Example III 100 parts melamine, 35 parts benzoguanamine, 55 parts acetone, 100 parts acetophenone and 300 parts formalin (30%) are boiled for 3 hours at the reflux condenser at a pH-value of 8.0. With the produced resin solution are mixed 250 parts of wood meal (sawdust) under addition of 3 parts of dichlorohydrine as acid acting hardening agent and dried at about 70° C. After a pressure time of 1 to 2 minutes at 140° C. one obtains from this shapes of a mold fast to boiling.

I claim:

1. A process of preparing a hardenable water-soluble liquid synthetic resin which comprises forming a hardenable water-soluble liquid condensation product by reacting under alkaline conditions in an aqueous medium simultaneously (1) a triazine having the formula

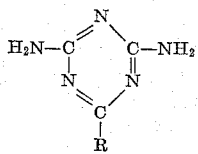

wherein R represents a member of the group consisting of amino, methyl, ethyl, phenyl and thioalkyl, (2) a ketone selected from the group consisting of aliphatic and cycloaliphatic ketones, and (3) formaldehyde.

2. A process as in claim 1 wherein the pH in said reaction medium is maintained between about 7.5 and 9.0.

3. A process of preparing a hardenable water-soluble liquid synthetic resin which comprises forming a hardenable water-soluble liquid condensation product by reacting under alkaline conditions in an aqueous medium simultaneously (1) a triazine having the formula

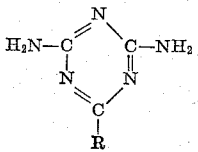

wherein R represents a member of the group consisting of amino, methyl, ethyl, phenyl and thialkyl, (2) a ketone selected from the group consisting of aliphatic and cycloaliphatic ketone, and (3) formaldehyde in molar proportions of 1 to 3 mols of ketone per mol of triazine and 3 to 9 mols of formaldehyde per mol of triazine.

4. A process of preparing a hardened synthetic resin which comprises forming a hardenable water-soluble liquid condensation product by reacting under alkaline conditions in an aqueous medium simultaneously (1) a triazine having the formula

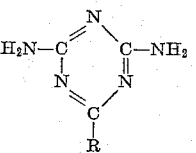

wherein R represents a member of the group consisting of amino, methyl, ethyl, phenyl and thioalkyl, (2) a ketone selected from the group consisting of aliphatic and cycloaliphatic ketones, and (3) formaldehyde, and thereafter forming a hardened synthetic resin by heating said product under conditions maintained acid by the presence of a member selected from the group consisting of acetic acid and dichlorohydrine.

5. A process of preparing a hardenable water-soluble liquid synthetic resin which comprises forming a hardenable water-soluble liquid condensation product by reacting under alkaline conditions in an aqueous medium simultaneously (1) a triazine having the formula

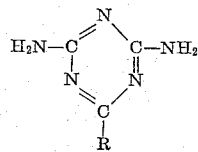

wherein R represents a member of the group consisting of amino, methyl, ethyl, phenyl and thioalkyl, (2) a ketone selected from the group consisting of aliphatic and cycloaliphatic ketones, and (3) formaldehyde in molar proportions of 1 to 3 mols of ketone per mol of triazine and 3 to 9 mols of formaldehyde per mol of triazine, and thereafter forming a hardened synthetic resin by heating said product under conditions maintained acid by the presence of a member selected from the group consisting of acetic acid and dichlorohydrine.

6. A process of preparing a hardenable water-soluble liquid synthetic resin which comprises forming a hardenable water-soluble liquid condensation product by reacting under alkaline conditions in an aqueous medium simultaneously (1) melamine, (2) acetone, and (3) formaldehyde.

7. A process of preparing a hardenable water-soluble liquid synthetic resin which comprises forming a hardenable water-soluble liquid condensation product by reacting under alkaline conditions in an aqueous medium simultaneously (1) melamine, (2) methylethyl-ketone, and (3) formaldehyde.

8. A process of preparing a hardened synthetic resin which comprises forming a hardenable water-soluble liquid condensation product by reacting under alkaline conditions in an aqueous medium simultaneously (1) melamine and benzoguanamine, (2) acetone and acetophenone, and (3) formaldehyde, and thereafter forming a hardened synthetic resin by heating said product under conditions maintained acid by the presence of dichlorohydrine.

9. A hardenable water-soluble liquid synthetic resin which comprises a product made by reacting under alkaline conditions in an aqueous medium simultaneously (1) a triazine having the formula

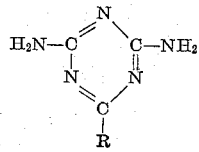

wherein R represents a member of the group consisting of amino, methyl, ethyl, phenyl and thioalkyl, (2) a ketone selected from the group consisting of aliphatic and cycloaliphatic ketones, and (3) formaldehyde.

10. A hardenable water-soluble liquid synthetic resin which comprises a product made by reacting under alkaline conditions in an aqueous medium simultaneously (1) a triazine having the formula

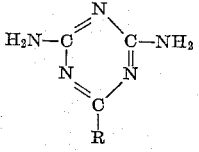

wherein R represents a member of the group consisting of amino, methyl, ethyl, phenyl and thioalkyl, (2) a ketone selected from the group consisting of aliphatic and cycloaliphatic ketones, and (3) formaldehyde, in molar proportions of 1 to 3 mols of ketone per mol of triazine and 3 to 9 mols of formaldehyde per mol of triazine.

11. A hardened synthetic resin which comprises a product made by reacting under alkaline conditions in an aqueous medium simultaneously (1) a triazine having the formula

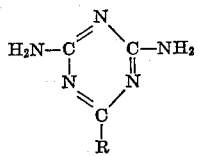

wherein R represents a member of the group consisting of amino, methyl, ethyl, phenyl and thioalkyl, (2) a ketone selected from the group consisting of aliphatic and cycloaliphatic ketones, and (3) formaldehyde, and thereafter heating said product under conditions maintained acid by the presence of a member selected from the group consisting of acetic acid and dichlorohydrine.

References Cited in the file of this patent

UNITED STATES PATENTS

| | | |
|---|---|---|
| 2,327,771 | D'Alelio | Aug. 24, 1943 |
| 2,364,900 | Hessel et al. | Dec. 12, 1944 |
| 2,389,682 | Nebel | Nov. 27, 1945 |
| 2,522,668 | Dudley | Sept. 19, 1950 |
| 2,640,043 | Sturm | May 26, 1953 |
| 2,681,892 | Kressman | June 22, 1954 |
| 2,689,228 | Thomas | Sept. 14, 1954 |
| 2,838,468 | Laurie | June 10, 1958 |
| 2,953,478 | Harvey et al. | Sept. 20, 1960 |